United States Patent
Jung et al.

(10) Patent No.: US 8,996,959 B2
(45) Date of Patent: Mar. 31, 2015

(54) ADAPTIVE COPY-BACK METHOD AND STORAGE DEVICE USING SAME

(71) Applicant: Samsung Electronics Co., Ltd., Suwon-Si, Gyeonggi-Do (KR)

(72) Inventors: Hyun-Uk Jung, Daejeon (KR); Dong-Gil Lee, Yongin-Si (KR); Jin-Yeong Kim, Suwon-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 122 days.

(21) Appl. No.: 13/716,360

(22) Filed: Dec. 17, 2012

(65) Prior Publication Data

US 2013/0159815 A1    Jun. 20, 2013

(51) Int. Cl.
*G11C 29/42* (2006.01)
*G06F 11/10* (2006.01)
*G06F 12/00* (2006.01)
*G06F 12/02* (2006.01)
*G11C 29/54* (2006.01)

(52) U.S. Cl.
CPC ............... *G06F 11/10* (2013.01); *G06F 12/00* (2013.01); *G06F 11/1008* (2013.01); *G06F 12/0246* (2013.01); *G06F 2212/7205* (2013.01)
USPC .......................................... 714/773; 714/718

(58) Field of Classification Search
CPC ... H03M 13/09; H04L 1/0061; H04L 1/0045; H04L 1/0057; G06F 11/1076; G06F 11/1008; G06F 11/1068; G06F 11/1072; G11C 29/56
See application file for complete search history.

(56) References Cited

U.S. PATENT DOCUMENTS

| | | | |
|---|---|---|---|
| 7,295,470 B2 | 11/2007 | Park et al. | |
| 7,392,457 B2 * | 6/2008 | Tamura et al. | 714/763 |
| 7,536,627 B2 * | 5/2009 | Gross et al. | 714/763 |
| 7,921,339 B2 * | 4/2011 | Chen et al. | 714/54 |
| 2003/0221062 A1 * | 11/2003 | Shimada | 711/114 |
| 2009/0106513 A1 * | 4/2009 | Cheng et al. | 711/162 |
| 2009/0244983 A1 * | 10/2009 | Park | 365/185.23 |
| 2010/0058003 A1 * | 3/2010 | Goto et al. | 711/154 |
| 2011/0161784 A1 * | 6/2011 | Selinger et al. | 714/768 |

FOREIGN PATENT DOCUMENTS

| | | | |
|---|---|---|---|
| KR | 1020070080038 A | | 8/2007 |
| KR | 1020110065757 A | | 6/2011 |

* cited by examiner

*Primary Examiner* — April Y Blair
*Assistant Examiner* — Dipakkumar Gandhi
(74) *Attorney, Agent, or Firm* — Volentine & Whitt, PLLC

(57) ABSTRACT

During a garbage collection process for a non-volatile memory device of a storage device, an adaptive copy-back method selectively performs either an external or an internal copy-back operation in view of certain performance conditions for a storage device. The external copy-back operation is performed when a number of error-corrected bits per unit size of read data exceeds a given threshold value, and the internal copy-back operation is performed when the number of error-corrected bits does not exceed the threshold value.

20 Claims, 16 Drawing Sheets

ADAPTIVE COPY-BACK METHOD AND STORAGE DEVICE USING SAME

CROSS-REFERENCE TO RELATED APPLICATIONS

This application claims the benefit of Korean Patent Application No. 10-2011-0145017 filed on Dec. 28, 2011, the subject matter of which is hereby incorporated by reference.

BACKGROUND

The inventive concept relates to methods of operating a storage device. More particularly, the inventive concept relates to adaptive copy-back methods for selectively performing copy-back operations in consideration of storage device performance. The inventive concept also relates to storage devices operating in this manner.

Advances in the design, manufacture and operation of non-volatile memory devices has enabled, for example, the replacement of the conventional hard disk drive (HDD) with the solid state drive (SSD). The SSD typically arranges a plurality of non-volatile memory devices according to a plurality of channels. The data storage space provided by the non-volatile memory devices of the SSD must be routinely managed to ensure efficient storage of data. Such management includes a so-called "garbage collection" process.

The garbage collection process essentially reallocates (or recycles) available memory space into larger and more useful memory blocks by consolidating a number of smaller or fractured memory blocks. One or more copy-back operations are required to perform the garbage collection process. Unfortunately, a data access bottleneck to a buffer memory in the SSD may occur when non-volatile memory devices associated with multiple channels seek to simultaneously perform copy-back operations as part of overlapping garbage operations. This bottleneck may dramatically reduce performance of the SSD.

SUMMARY

The inventive concept provides an adaptive copy-back method capable of suppressing performance reduction of a storage device due to a bottleneck phenomenon of accesses to a buffer memory in consideration of reliability of the storage device.

The inventive concept also provides a storage device performing a copy-back operation capable of suppressing performance reduction of a storage device due to a bottleneck phenomenon of accesses to a buffer memory in consideration of reliability of the storage device.

In one embodiment, the inventive concept provides an adaptive copy-back method comprising; reading data from a source page of a non-volatile memory device and storing the data in a page buffer with the non-volatile memory device, performing error correction on the data stored in the page buffer according to a given unit size using error correction code (ECC) to determine a number of error-corrected bits and to generate error-corrected data, storing the error-corrected data in a buffer memory external to the non-volatile memory device, and selectively performing either an external copy-back process using the error-corrected stored in the buffer memory, or an internal copy-back operation using the data stored in the page buffer in accordance with the number of error-corrected bits.

In another embodiment, the inventive concept provides an adaptive copy-back method comprising; determining whether a performance reduction condition occurs due to a bottleneck phenomenon related to input/output (I/O) accesses to a buffer memory of a storage device, selecting a first copy-back operation if the performance reduction condition occurs and selecting a second copy-back operation if the performance reduction condition does not occur, wherein upon selecting the first copy-back operation, data stored in a page buffer of a memory device is programmed in a target page of the memory device without accessing data stored in the buffer memory when a number of error-corrected bits per unit size of the data read from a source page to the page buffer is less than a threshold value, and upon selecting the second copy-back operation, reading error-corrected data stored in the buffer memory and programming the error-corrected data in the target page of the memory device.

In another embodiment, the inventive concept provides a storage device comprising; a non-volatile memory device comprising a page buffer that temporarily stores data read from at least one source page, a buffer memory external to the non-volatile memory device, and a memory controller that performs error correction on the data provided from the page buffer to generate error-corrected data and determine a number of error-correct bits per unit size of the data, stores the error-corrected data in the buffer memory, and then selectively performs, in view of the number of error-corrected bits per unit size of the data, one of an external copy-back operation using the error-corrected data stored in the buffer memory, and an internal copy-back operation using the data stored in the page buffer.

In another embodiment, the inventive concept provides a method of operating a storage device including a non-volatile memory device having multiple non-volatile memory chips arranged in operation according to multiple channels and a volatile buffer memory, the method comprising; during a garbage collection process for the non-volatile memory device, determining whether a performance reduction condition exists by determining a number of the multiple channels accessing the buffer memory, and upon determining that the performance reduction condition exists, performing at least one copy-back operation. The at least one copy-back operation will be an external copy-back operation that transfers data stored in the buffer memory to the non-volatile memory when a number of error-corrected bits per unit size for data stored in a page buffer of the non-volatile memory device exceeds a threshold value, and an internal copy-back operation that does not transfer data stored in the buffer memory to the non-volatile memory when the number of error-corrected bits per unit size for the data stored in the page buffer does not exceed the threshold value.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION

Certain embodiments of the inventive concept will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the concept of the inventive concept to one of ordinary skill in the art. Throughout the written description and drawings, like reference numbers and labels are used to denote like or similar elements.

The terminology used herein is for the purpose of describing particular embodiments and is not intended to limit the inventive concept. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined differently, all terms used in the description including technical and scientific terms have the same meaning as generally understood by one of ordinary skill in the art. Terms as defined in a commonly used dictionary should be construed as having the same meaning as in an associated technical context, and unless defined in the description, the terms are not ideally or excessively construed as having formal meaning.

Figure 1:
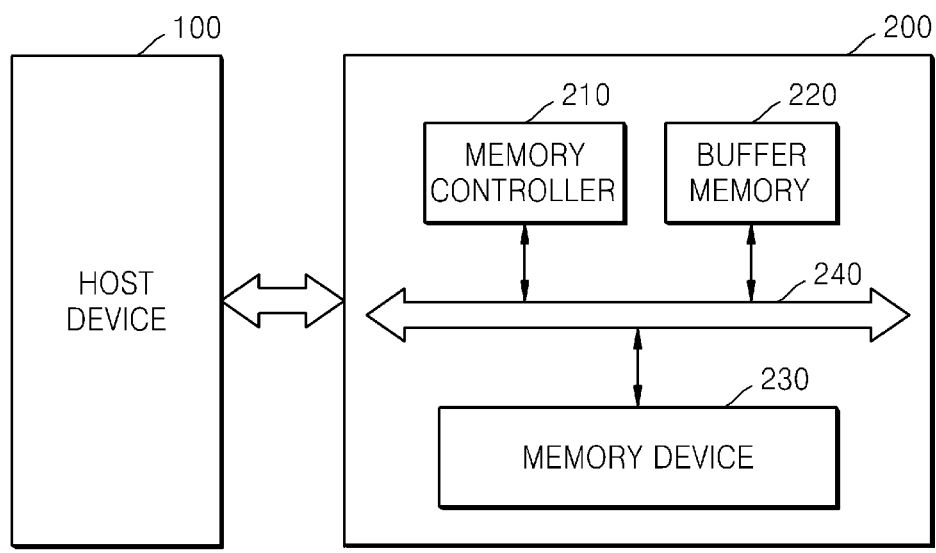
FIG. 1 is a block diagram of a memory system according to an embodiment of the inventive concept.

Figure (FIG. 1 is a general block diagram of a memory system 1000 according to an embodiment of the inventive concept. The memory system 1000 comprises a host device 100 and a storage device 200, where the storage device 200 includes a memory controller 210, a buffer memory 220, a memory device 230, and a bus 240.

The bus 240 is a signal transmission path (or collection of signal transmission paths) that may be used to communicate information (e.g., data, addresses, and/or control signals) between the other elements of the storage device 200.

It is assumed for purposes of the description that follows that the memory device 230 is implemented using one or more non-volatile memory devices (e.g., flash memory devices) and that the storage device 200 operates as a SSD in relation to the host device 100. Within this context, the memory controller 210 controls the execution of erase, write, and/or read operation by the memory device 230 in response to command(s) received from the host device 100.

A plurality of channels may be formed between the memory controller 210 and the memory device 230, wherein each channel is associated with a plurality of ways. Here, the term "way" may be understood as referring to a bank of memory devices. One exemplary arrangement of channels and ways will be described hereafter with reference to FIG. 3.

Those skilled in the art will understand that the memory device 230 may include one or more types of non-volatile memory other than, or additional to, the flash memory assumed in the working example. For example, the memory device 230 may include phase change random access memory (PRAM), ferroelectric random access memory (FRAM), magnetic random access memory (MRAM), etc. The memory device 230 may include a combination of at least one non-volatile memory device and at least one volatile memory device, or may include a combination of two or more non-volatile memory devices.

The buffer memory 220 may be used to temporarily store data communicated between the memory controller 210 and memory device 230, and/or data communicated between the storage device 200 and host device 100. The memory controller 210 will typically install firmware controlling data input and output (I/O) operations for the buffer memory 220. As illustrated in FIG. 1, the buffer memory 220 may be physically disposed external to the memory controller 210. Alternatively, the buffer memory 220 may be disposed internal to the memory controller 210. The buffer memory 220 may be implemented using one or more random access memory (RAM) such as dynamic RAM (DRAM) and/or static RAM (SRAM).

The memory controller 210 may also be used to control the overall operation of the storage device 200. Specifically, the memory controller 210 may control write/read operations communicating data between the buffer memory 220 and memory device 230 in response to command(s) received from the host device 100.

The firmware (hardware and/or software) installed within the memory controller 210 may additionally be used to control execution of a copy-back operation commonly performed as part of a garbage collection process. Examples of an adaptive copy-back method consistent with embodiments of the inventive concept will be described in relation to FIGS. 10 through 15.

Figure 2:
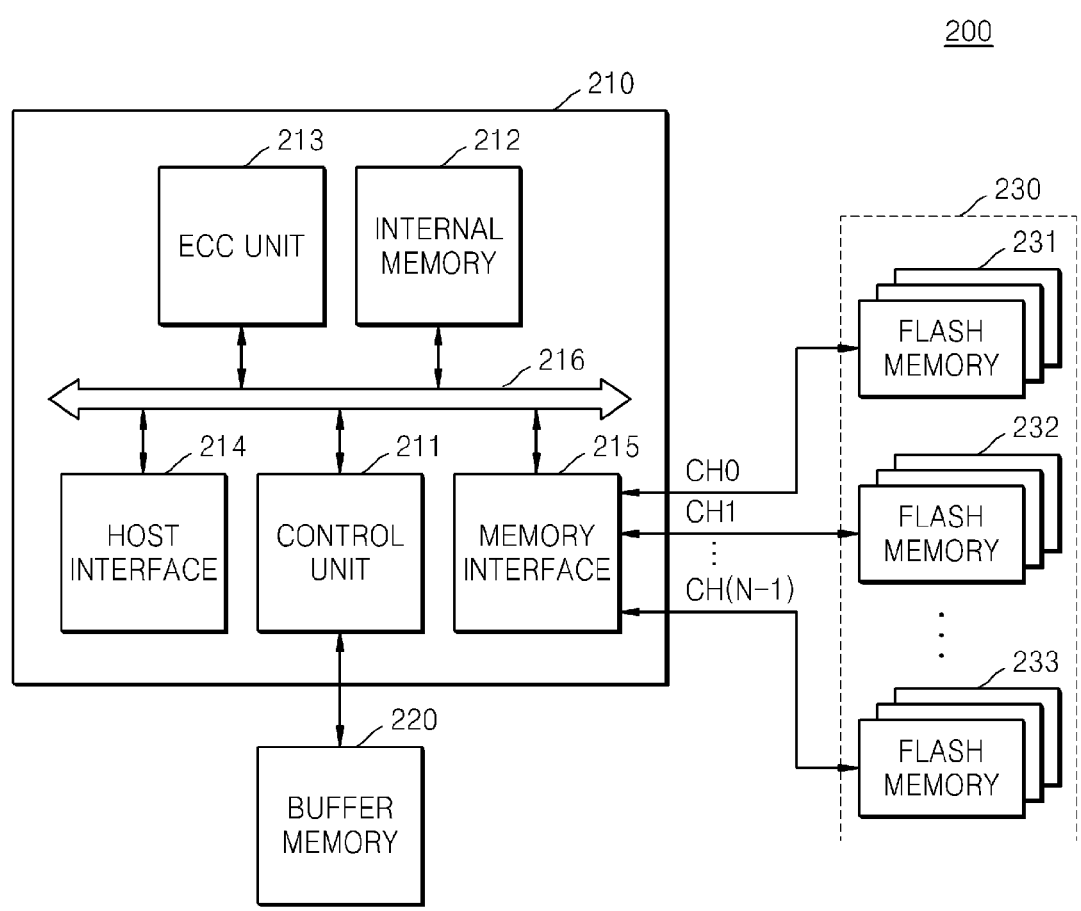
FIG. 2 is a block diagram further illustrating the storage device of FIG. 1.

FIG. 2 is a block diagram further illustrating the storage device 200 and memory controller 210 of FIG. 1.

Referring to FIG. 2, the memory controller 210 includes a control unit 211, an internal memory 212, an error correction code (ECC) unit 213, a host interface 214, a memory interface 215, and a bus 216.

The bus 216 is a signal transmission path (or collection of signal transmission paths) that may be used to communicate information (e.g., data, addresses, and/or control signals) between the other elements of the memory controller 210.

The control unit 211 may be used to control the overall operation of the memory controller 210. The control unit 211, the internal memory 212, and the ECC unit 213 may be implemented (i.e., fabricated) as a single chip using conventionally understood system on chip (SoC) technologies. Alternatively, the control unit 211, the internal memory 212, the ECC unit 213, the host interface 214, and the memory interface 215 may be fabricated as two or more separate semiconductor devices assembled as a working system.

The internal memory 212 may be used to store program code and data required to control the operations performed by the storage device 200. For example, the program code required to perform the adaptive copy-back methods illustrated in FIGS. 10 through 15 may be stored in the internal memory 212. The internal memory 212 may also be used to store metadata used to map addresses.

The control unit 211 may be used to control the storage device 200 to perform the adaptive copy-back method illustrated in FIGS. 10 through 15 according to the program code and data stored in the internal memory 212. The control unit 211 may also be used to schedule flash write operations so as to effectively distribute the resulting write data across a plurality of channels and ways within the memory device 230. The control unit 211 may be used to check the number of operations allocated to each channel and way.

During the write operation, the ECC unit 213 may be used to generate an ECC related to received data using conventionally understood algorithm(s) such as those used to generate Reed-Solomon (RS) code, Hamming code, cyclic redundancy code (CRC), etc. Also, during the read operation, the ECC unit 213 may be used to perform error detection and correction on received data using previously generated ECC together with the data. The error correction performance for the ECC unit 213, as measured by a defined unit size, is determined by the ECC engine being used. In certain embodiments, the unit size may be defined as a particular sector size. For example, an ECC engine capable of correcting a 12-bit error in a 512-byte sector may be included in the ECC unit 213. The ECC unit 213 may include a plurality of ECC engines corresponding to the number of channels connected to the memory device 230. Each ECC engine may operate independently and may calculate the number of error-corrected bits in a unit size.

The host interface 214 operates according to one or more data communication protocol(s) designed to control the exchange of data between the host device 100 and storage device 200. The host interface 214 may be implemented as an Advanced Technology Attachment (ATA) interface, a Serial Advanced Technology Attachment (SATA) interface, a Parallel Advanced Technology Attachment (PATA) interface, a Universal Serial Bus (USB) or Serial Attached Small Computer System (SAS) interface, a Small Computer System Interface (SCSI), an embedded Multi Media Card (eMMC) interface, or a Unix File System (UFS) interface. However, the above-mentioned interfaces are merely examples and the host interface 214 is not limited thereto. The host interface 214 may be used to exchange command, address, and/or data signals (and/or signal packets) between the host device 100 and the control unit 211.

The memory interface 215 may be used to connected to the memory device 230 to the memory controller 210. That is, the memory interface 215 may exchange control, address, and/or data signal(s) with the memory device 230 via a plurality of channels and ways under the control of the control unit 211. In the working example, it is assumed that the memory interface 215 supports at least one of NAND flash memory and NOR flash memory.

Figure 3:
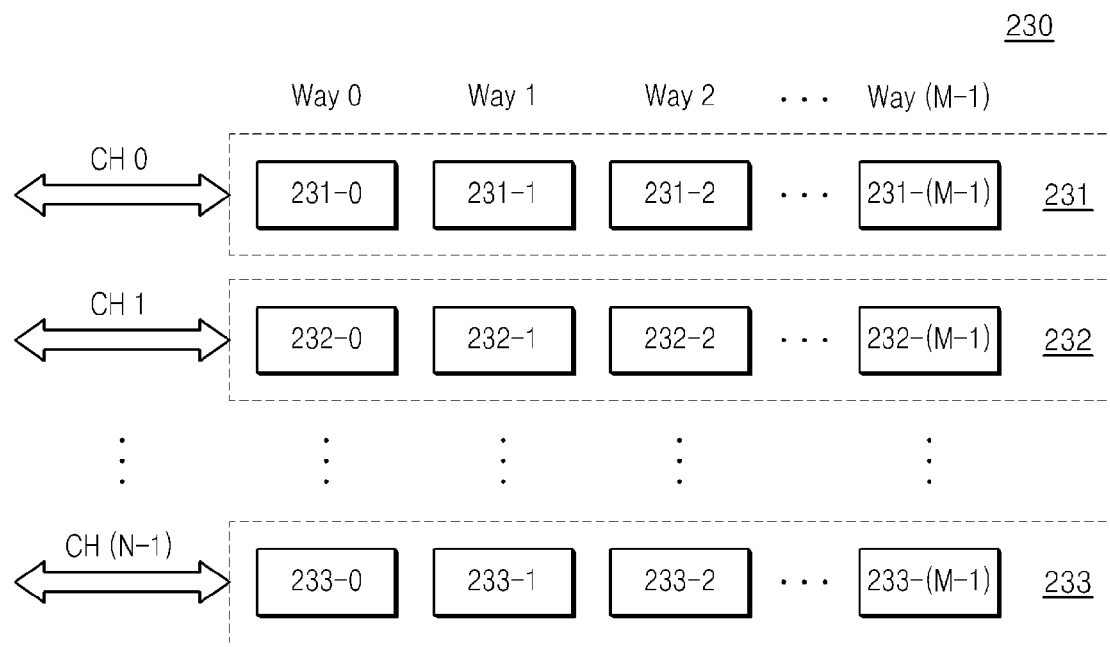
FIG. 3 is a conceptual diagram illustrating a number of channels and ways of the memory device illustrated in FIG. 1.

As further illustrated in FIGS. 2 and 3, the memory device 230 includes a plurality of flash memories connected to the memory interface 215 via the channels and ways.

Namely, a plurality of channels CH0 through CH(N-1) may be electrically connected to a plurality of flash memories 231 through 233. The channels CH0 through CH(N-1) may be independent buses capable of transmitting and receiving control signals, addresses, and data to and from corresponding flash memories 231 through 233. Different flash memories 231 through 233 connected to different channels CH0 through CH(N-1) may operate independently. Each of the flash memories 231 through 233 may form a plurality of ways way0 through way(M-1). M ways way0 through way(M-1) formed in each channel may be connected to each of M flash memories 231 through 233.

For example, the flash memory 231 may form the M ways way0 through way(M-1) in the channel CH0. Flash memory chips 231-0 through 231-(M-1) respectively corresponding to the M ways way0 through way(M-1) may be connected to the channel CH0. The above-described correlations may also be applied to each of the flash memories 232 through 233.

Ways are units identifying flash memory chips having a common position along a respective channel (e.g., a "column" position in relation to a channel "row"). Each flash memory chip may be identified according to a channel number and a way number. A channel and a way of a flash memory chip for executing a command provided from the host device 100 may be determined based on a logical block address (LBA) transmitted from the host device 100.

Figure 4:
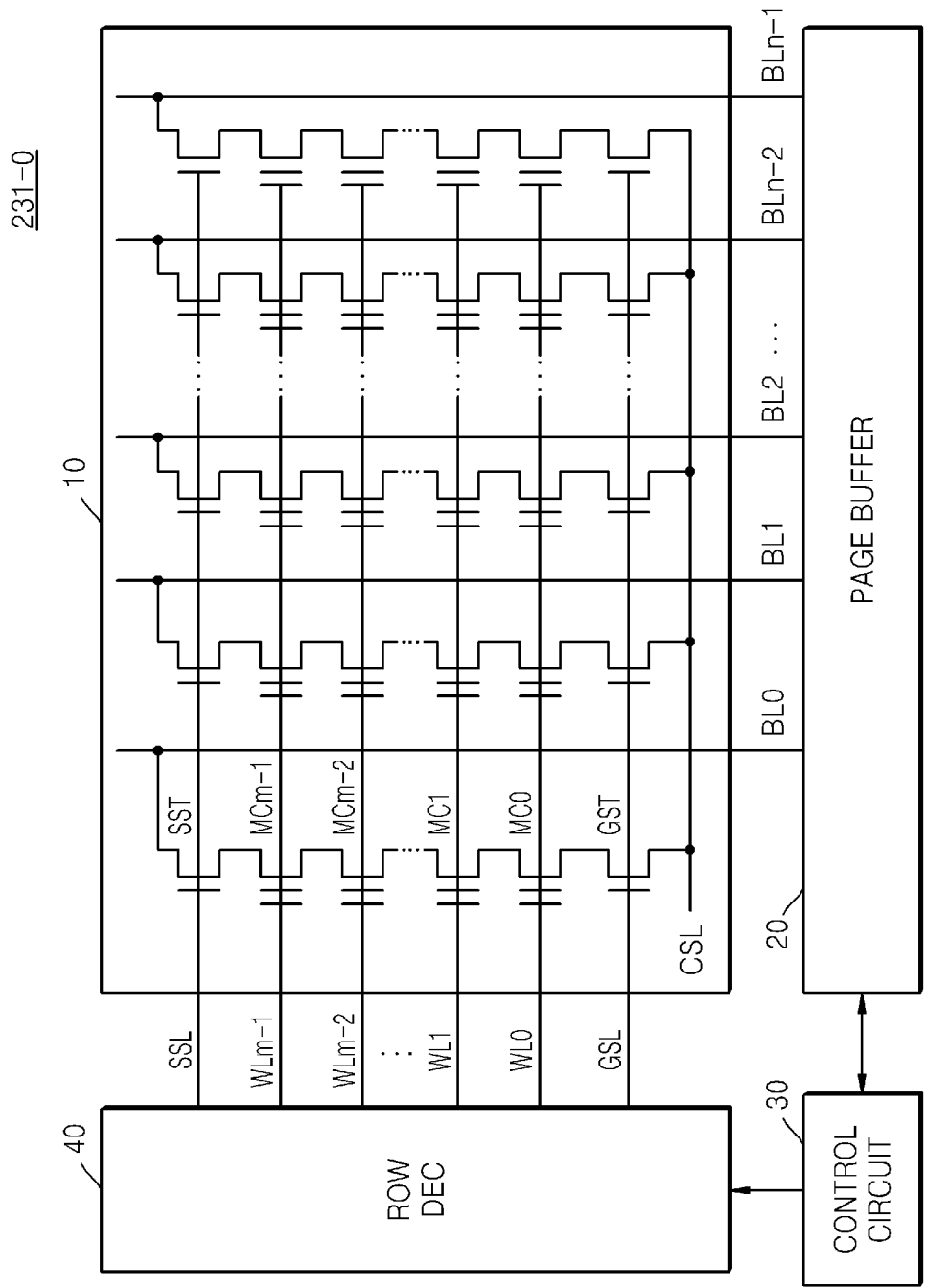
FIG. 4 is a block diagram illustrating a flash memory chip that may be used in the memory device of FIG. 1.

FIG. 4 is a block diagram illustrating in relevant portion a circuit structure for one flash memory chip (e.g., the flash memory chip 231-0) included in the memory device 230 of FIG. 2.

As illustrated in FIG. 4, the flash memory chip 231-0 comprises a cell array 10, a page buffer 20, a control circuit 30, and a row decoder 40.

The cell array 10 is a region into which data is written by applying a certain voltage to a transistor. The cell array 10 includes memory cells formed where a plurality of word lines WL0 through WLm-1 and a plurality of bit lines BL0 through BLn-1 cross each other. Here, m and n are natural numbers. Although one memory block is illustrated in FIG. 4, the cell array 10 may include a plurality of memory blocks. Each memory block includes pages corresponding to the word lines WL0 through WLm-1. Each page includes a plurality of memory cells connected to each word line. The flash memory chip 231-0 performs an erase operation in units of a block, and performs a program or read operation in units of a page.

The cell array 10 has a structure of cell strings. Each cell string includes a string selection transistor SST connected to a string selection line SSL, a plurality of memory cells MC0 through MCm-1 respectively connected to the word lines WL0 through WLm-1, and a ground selection transistor GST connected to a ground selection line GSL. Here, the string selection transistor SST is connected between a bit line and a string channel, and the ground selection transistor GST is connected between the string channel and a common source line CSL.

The page buffer 20 is connected to the cell array 10 via the bit lines BL0 through BLn-1. The page buffer 20 temporarily stores data to be written into or data read from memory cells connected to a selected word line.

The control circuit 30 generates various voltages required to perform write or read, and erase operations, receives control signals, and controls overall operations of the flash memory chip 231-0.

The row decoder 40 is connected to the cell array 10 via the string selection line SSL, the ground selection line GSL, and the word lines WL0 through WLm-1. In a write or read operation, the row decoder 40 receives an address and selects any one word line according to the received address. Here, the selected word line is connected to memory cells on which the write or read operation is to be performed.

Also, the row decoder 40 applies voltages required to perform a program or read operation, e.g., a program voltage, a pass voltage, a read voltage, a string selection voltage, and a ground selection voltage, to the selected word line, unselected word lines, the string selection line SSL, and the ground selection line GSL.

Each memory cell may store one-bit data or two-or-more-bit data. A memory cell for storing one-bit data is referred to as a single level cell (SLC). A memory cell for storing two-or-more-bit data is referred to as a multi level cell (MLC). An SLC has an erase or program state according to a threshold voltage.

In particular, since the reliability of flash memory including MLCs is reduced due to factors such as a time of use and a program/erase cycle, ECC correction may be disabled. A physical page of flash memory includes a spare region and ECC information is stored in the spare region.

Figure 5:
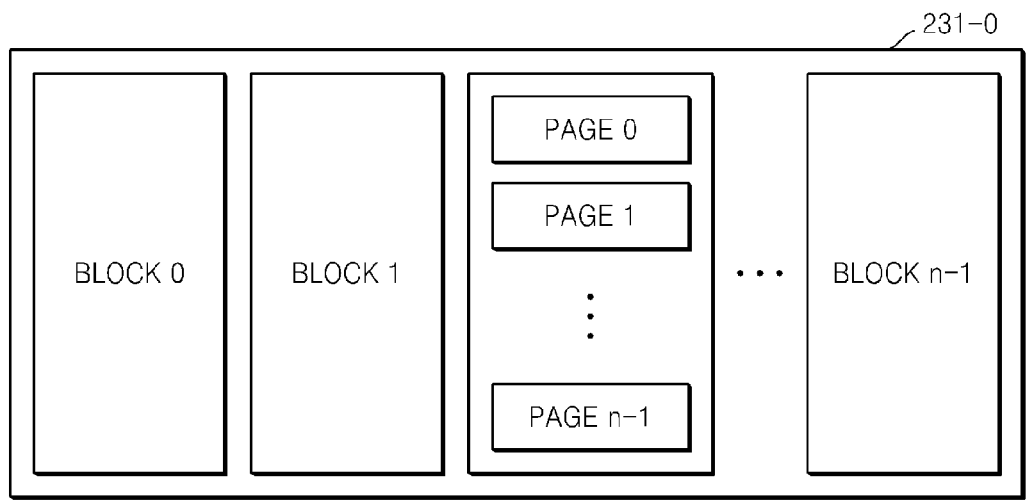
FIG. 5 is a block diagram further illustrating one possible arrangement for the memory cell array of the flash memory of FIG. 4.

As illustrated in FIG. 5, one possible internal structure for the flash memory chip 231-0 may include a plurality of blocks, wherein each block includes a plurality of pages.

The flash memory chip 231-0 writes and reads data in page units, but electrically erases data in block units. Given the well-known characteristics of flash memory a block erase operation may be required before each write operation, as a direct overwrite capability is not provided.

Thus, the absence of a direct overwrite capability may not allow user defined write data from being written to a user-desired (host indicated) physical region of the SSD. Accordingly, if access to a region for writing or reading user data is requested by a user, address translation between a logical address for the region and a corresponding physical address to a physical region in which the user data is or is to be stored is required.

Figure 6:
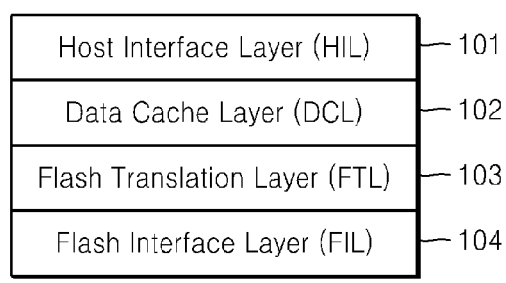
FIG. 6 is a conceptual diagram illustrating various logical layers associated with firmware installed in the memory controller of FIG. 1.

FIG. 6 is a conceptual diagram illustrating a logical layer hierarchy for firmware installed in the memory controller 210 of FIG. 2.

A host interface layer (HIL) 101 functions to control an interface operation between the host device 100 and the host interface 214. Software or firmware for performing the function of the HIL 101 may be installed in the host interface 214 or may be stored in the internal memory 212 so as to be used to control operation of the host interface 214.

A data cache layer (DCL) 102 functions to control a read or write operation of the internal memory 212 or the buffer memory 220. Software or firmware for performing the function of the DCL 102 may be installed in the control unit 211 or may be stored in the internal memory 212 so as to be used by the control unit 211 to control the read or write operation of the internal memory 212 or the buffer memory 220.

A flash translation layer (FTL) 103 functions to translate a logical address provided from the host device 100 into a physical address for performing a read or write operation on the memory device 230. Software or firmware for performing the function of the FTL 103 may be installed in the control unit 211 or may be stored in the internal memory 212. The FTL 103 translates a logical address into a physical address by using mapping information included in metadata. As an address mapping method, a page or block mapping method may be used. The page mapping method is a method of performing address mapping in units of a page, and the block mapping method is a method of performing address mapping in units of a block. Also, a combined mapping method of the page and block mapping methods may be used. Here, a physical address indicates a location for storing data in the memory device 230.

A flash interface layer (FIL) 104 functions to control an interface operation between the memory interface 215 and flash memories included in the memory device 230. Software or firmware for performing the function of the FIL 104 may be installed in the memory interface 215 or may be stored in the internal memory 212.

With the foregoing exemplary memory system in mind, the bottleneck phenomenon occurring in relation to the buffer memory 220 of the storage device 200, as illustrated in FIG. 1, will now be described in some additional detail with reference to FIG. 7.

Data input requests and/or data output requests (hereafter, collectively and singularly referred to as "I/O accesses") to the buffer memory 220 may simultaneously occur via a number of the plurality of channels as part of ongoing garbage collection processes and/or as the result of I/O accesses resulting from command(s) received from the host device 100.

Figure 7:
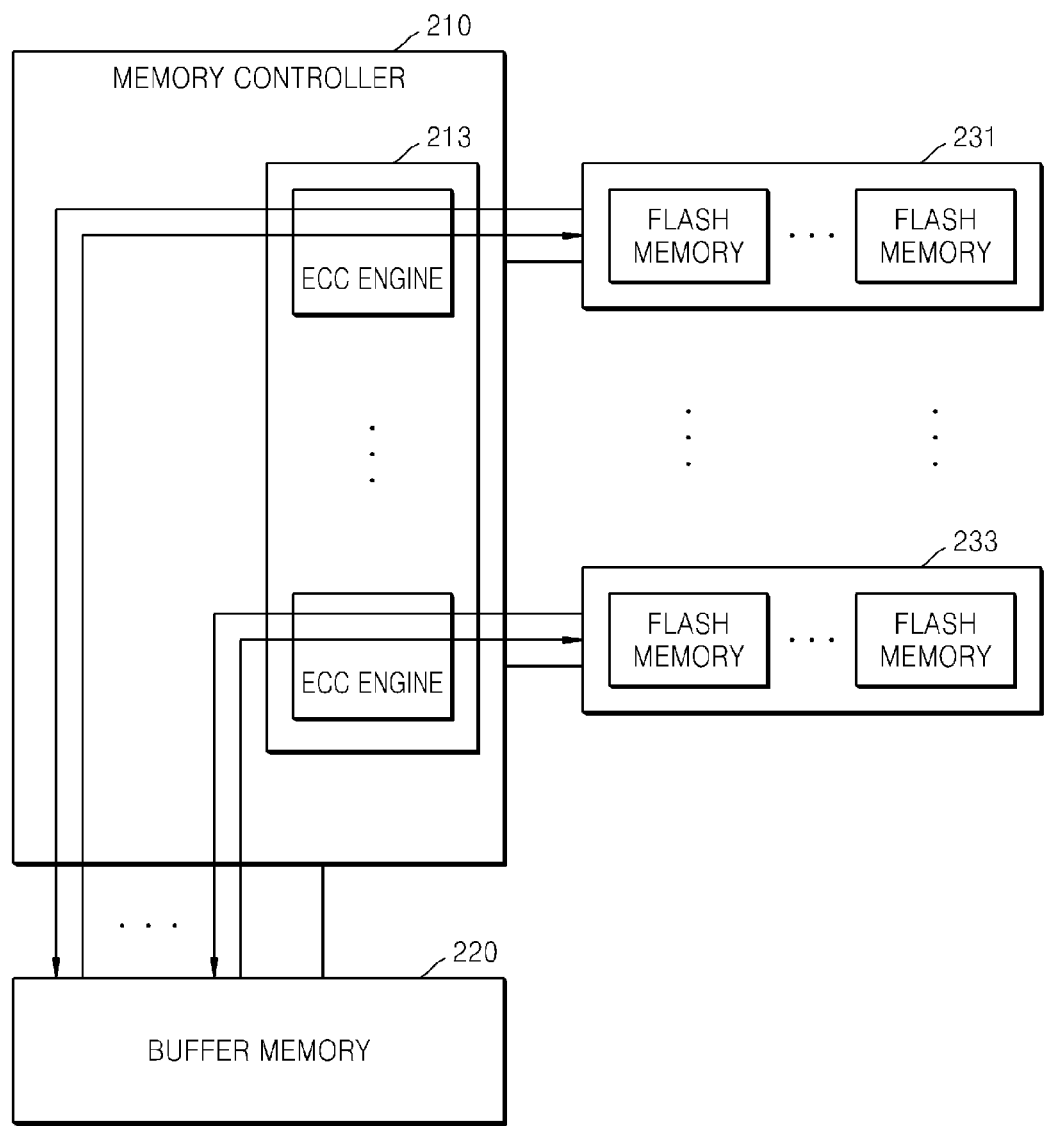
FIG. 7 is a block diagram illustrating the bottleneck phenomenon related to accessing the buffer memory of FIG. 1.

As conceptually illustrated in the block diagram of FIG. 7, if a garbage collection process is performed using an external copy-back operation, I/O accesses to the buffer memory 220 may simultaneously occur via a plurality of channels. That is, the "collision" of I/O accesses by (e.g.,) a first channel 231 and a third channel 233 at the buffer memory 220 may markedly reduce the performance of the memory system 1000 when the combined effects of the multiple I/O accesses exceed the bandwidth capabilities of the buffer memory 220.

Figure 8:
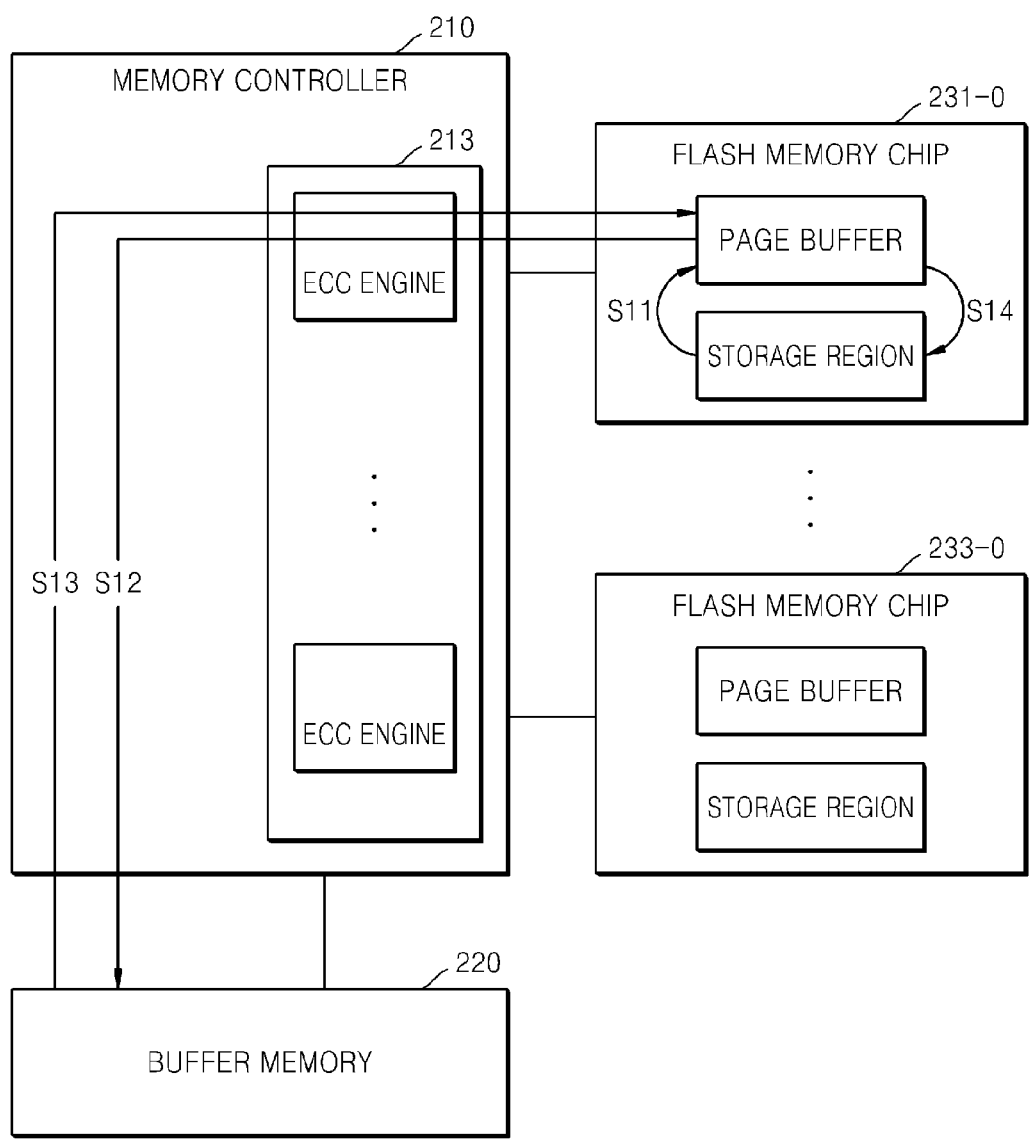
FIG. 8 is a block diagram illustrating one possible approach to data processing during an external copy-back operation according to an embodiment of the inventive concept.

FIG. 8 is a block diagram further illustrating data processing during an external copy-back operation according to an embodiment of the inventive concept. FIG. 8 shows data processing in an external copy-back operation performed by one of a plurality of flash memory chips, e.g., the flash memory chip 231-0, included in the memory device 230 illustrated in FIG. 2. The same external copy-back operation may also be performed by the other flash memory chips.

Referring to FIG. 8, the memory controller 210 controls the storage device 200 to perform an external copy-back operation in the following order.

Initially, data is read from a source page of the flash memory chip 231-0 corresponding to a channel and a way, and is stored in a page buffer of the flash memory chip 231-0 (S11). Then, the memory controller 210 receives the data from the page buffer of the flash memory chip 231-0, error-corrects the received data using an ECC engine included in the ECC unit 213, and stores the error-corrected data in the buffer memory 220 (S12).

Then, the memory controller 210 receives the data from the buffer memory 220, adds ECC to the received data using the ECC engine, and stores the data in the page buffer of the flash memory chip 231-0 (S13). Then, the data stored in the page buffer is programmed in a target page of a storage region of the flash memory chip 231-0 (S14).

As described above, since an external copy-back operation is performed using data stored in the buffer memory 220 the bandwidth demands placed upon buffer memory 220 are increased.

Figure 9:
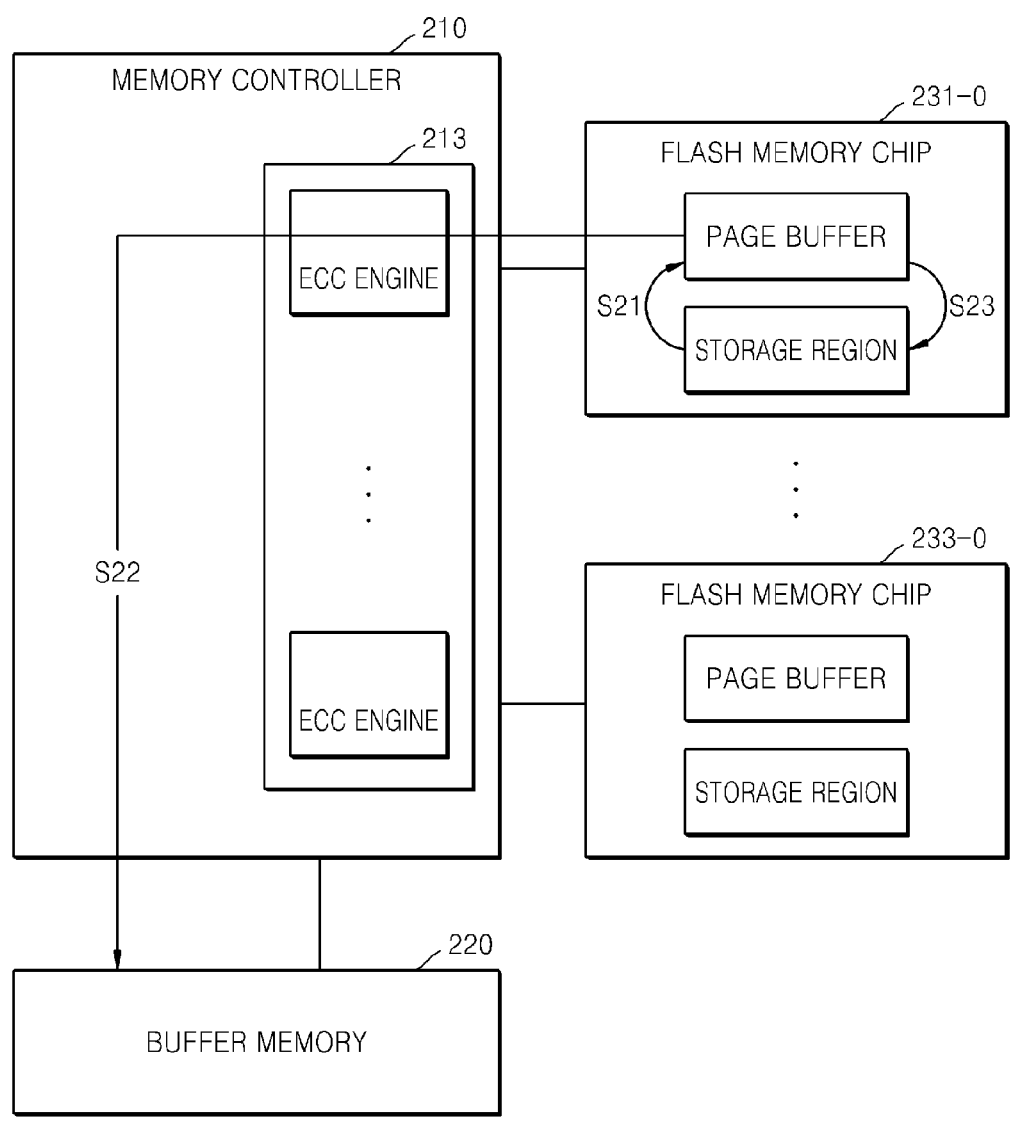
FIG. 9 is a block diagram illustrating one possible approach to data processing during an internal copy-back operation according to an embodiment of the inventive concept.

FIG. 9 is a block diagram illustrating data processing during an internal copy-back operation according to an embodiment of the inventive concept. FIG. 9 shows data processing during an internal copy-back operation performed by one of a plurality of flash memory chips, e.g., the flash memory chip 231-0, included in the memory device 230 illustrated in FIG. 2. The same internal copy-back operation may also be performed by the other flash memory chips.

Referring to FIG. 9, the memory controller 210 controls the storage device 200 to perform an internal copy-back operation in the following order.

Initially, data is read from a source page of the flash memory chip 231-0 corresponding to a channel and a way, and is stored in a page buffer of the flash memory chip 231-0 (S21). Then, the memory controller 210 receives the data from the page buffer of the flash memory chip 231-0, error-corrects the received data by using an ECC engine included in the ECC unit 213, and stores the error-corrected data in the buffer memory 220 (S22).

If the number of bits error-corrected by the ECC engine in a unit size does not exceeds a given threshold value, the memory controller 210 controls the storage device 200 to program the data stored in the page buffer of the flash memory chip 231-0 in a target page of a storage region of the flash memory chip 231-0 without accessing the buffer memory 220 (S23). As described above, since the internal copy-back operation is performed without accessing data stored in the buffer memory 220, the bandwidth demands placed upon the buffer memory 220 are reduced in comparison with the external copy-back operation described above.

According to certain embodiments of the inventive concept, the memory controller 210 may control the storage device 200 to selectively perform either the external copy-back operation or the internal copy-back operation during garbage collection processes. This type of "adaptive" copy-back operation for the storage device 200 by the control of the memory controller 210 will now be described with reference to FIGS. 10 through 15.

Figure 10:
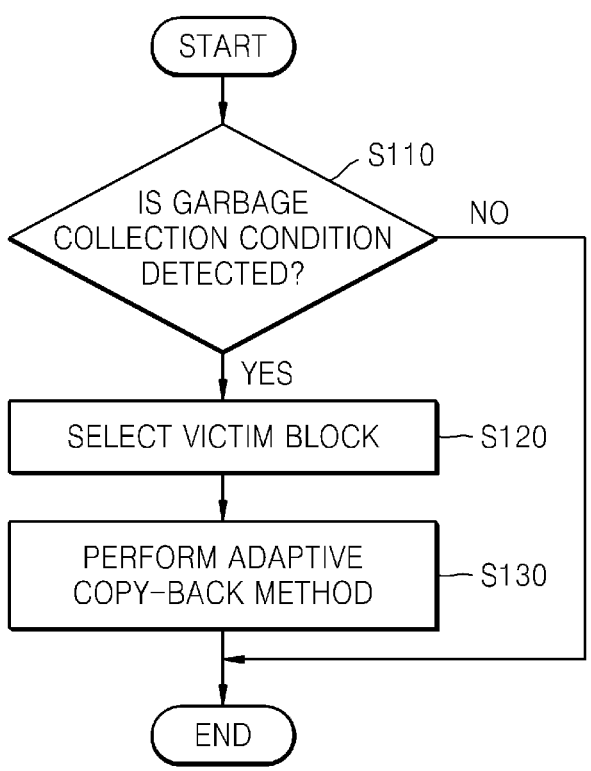
FIG. 10 is a flowchart summarizing a garbage collection method according to an embodiment of the inventive concept.

One method of garbage collection for the storage device 200 by the control of the memory controller 210 according to an embodiment of the inventive concept will now be described in some additional detail with reference to FIG. 10.

The memory controller 210 determines according to one or more defined conditions whether the storage device 200 requires execution of a garbage collection process (S110). For example, positive garbage collection condition (S110=YES) may be detected if the number of free blocks in one or more flash memory chips included in the memory device 230 is less than a threshold value. A "free block" is a block within the flash memory chip that is available to store data.

Upon determining that the storage device 200 requires garbage collection (S110=YES), the memory controller 210 now selects at least one "victim block" from among data blocks of the flash memory chip that exhibits the garbage collection condition(s) (S120). Here, a victim block may be a block currently storing data according to certain conditions, such as a block in which all pages are used up and not available to store data. In certain embodiments, a selected victim block may be a memory block having a lowest "garbage collection cost". Garbage collection cost falls for a particular block as the number of invalid pages in the block increases.

Then, the memory controller 210 performs an adaptive copy-back method so as to control the storage device 200 to copy the data stored in valid page(s) of the victim block to an empty page of an active block (S130). Here, an "active block" is a block in which data is stored, and indicates a block having empty page available for storing data. If an active block does not exist, the memory controller 210 controls the storage device 200 to copy the data stored in valid page(s) of the victim block to a free block.

Figure 11:
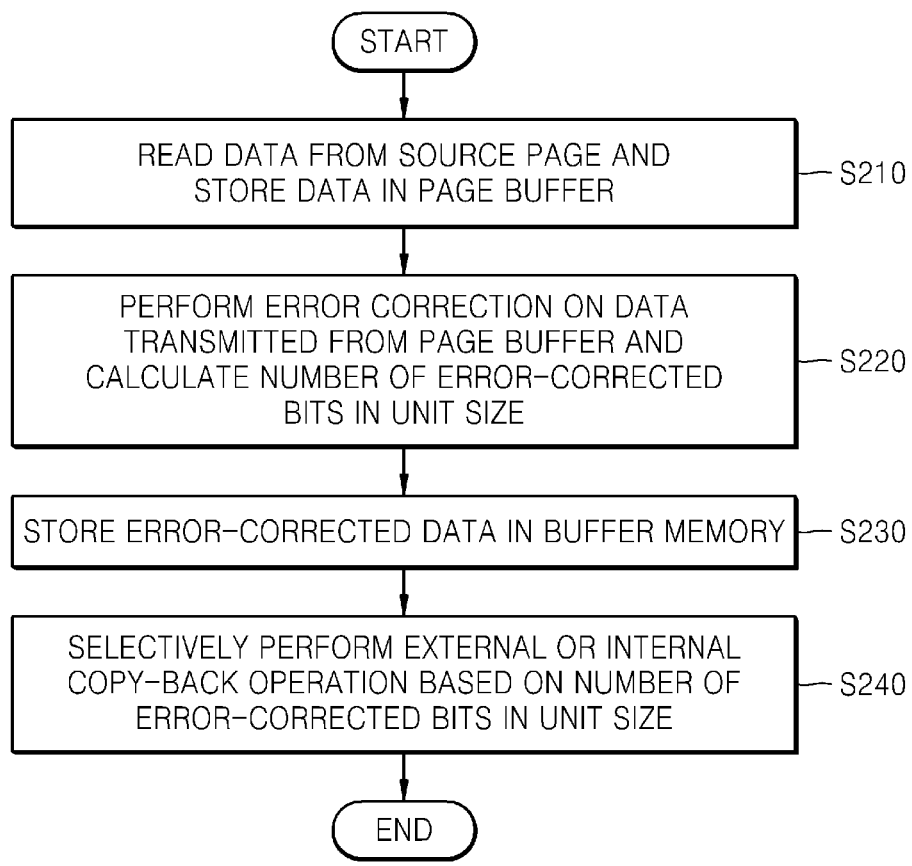
FIG. 11 is a flowchart summarizing an adaptive copy-back method according to an embodiment of the inventive concept.

FIG. 11 is a flowchart further describing an adaptive copy-back method according to an embodiment of the inventive concept.

With additional reference to block diagram of FIG. 2, the memory controller 210 controls the storage device 200 to read data from a source page of the memory device 230 and store the data in a page buffer (S210). The source page indicates a valid page included in a data block selected as a victim block. For example, referring to FIG. 8, data read from a source page included in a storage region of the flash memory chip 231-0 is stored in a page buffer of the flash memory chip 231-0.

The memory controller 210 then receives the data from the page buffer, performs error correction on the received data by using an ECC engine included in the ECC unit 213, and calculates a number of error-corrected bits in relation to a given unit size (S220).

The memory controller 210 then controls the storage device 200 to store the error-corrected data in the buffer memory 220 (S230).

Then, the memory controller 210 controls the storage device 200 to selectively perform an external or internal copy-back operation based on the number of error-corrected bits in a unit size (S240). This particular operation (S240) will be described in some additional detail with reference to FIG. 12.

Figure 12:
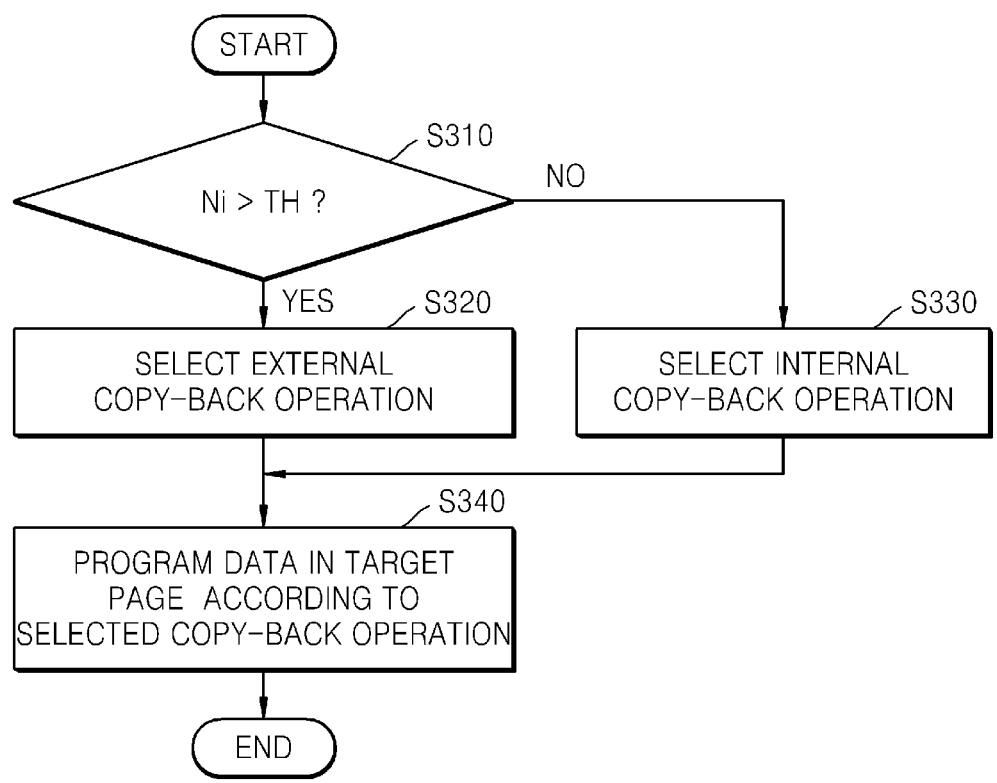
FIG. 12 is a more detailed flowchart summarizing the steps of selecting and performing the external or internal copy-back operation within the method of FIG. 11.

FIG. 12 is a flowchart further describing the step of selectively performing either an external copy-back operation or an internal copy-back operation based on the number of error-corrected bits in a unit size within the method of FIG. 11.

The memory controller 210 determines whether the number "Ni" of error-corrected bits in a unit size exceeds a given threshold value "TH" (S310). The threshold value TH may be set to be less than a maximum number of error-correctable bits for the operative ECC engine given the unit size of data. For example, if the memory controller 210 includes an ECC engine capable of correcting up to 12 errant bits in a sector (unit size) of 512 bytes, then the threshold value TH may be set to 6. Alternatively, the threshold value TH may be set to some other value less than 12. In view of the set threshold value, although the data stored in a page buffer of the memory device 230 may include some error bits, the data may nonetheless be moved to a target page without necessarily performing error correction and then may be read from the target page to determine the threshold value TH within an error-correctable range. If one page includes a plurality of unit sizes, whether the number Ni of error-corrected bits exceeds the threshold value TH may be determined in relation to each unit size.

If the number Ni of error-corrected bits for a unit size exceeds the threshold value TH (S310=YES), the memory controller 210 selects an external copy-back operation (S320). For example, when one page includes a plurality of unit sizes, if the number Ni of error-corrected bits in any one of the unit sizes exceeds the threshold value TH, the external copy-back operation is selected.

If the number Ni of error-corrected bits in a unit size does not exceed the threshold value TH (S310=NO), the memory controller 210 selects an internal copy-back operation (S330).

The memory controller 210 programs data in a target page of the memory device 230 according to the selected copy-back operation (S340). For example, if the external copy-back operation is selected, the memory controller 210 reads data from the buffer memory 220, adds an ECC to the read data, and programs the data in the target page of the memory device 230. However, if the internal copy-back operation is selected, the memory controller 210 programs data stored in a page buffer of the memory device 230, in the target page of the memory device 230 without accessing the buffer memory 220.

Figure 13:
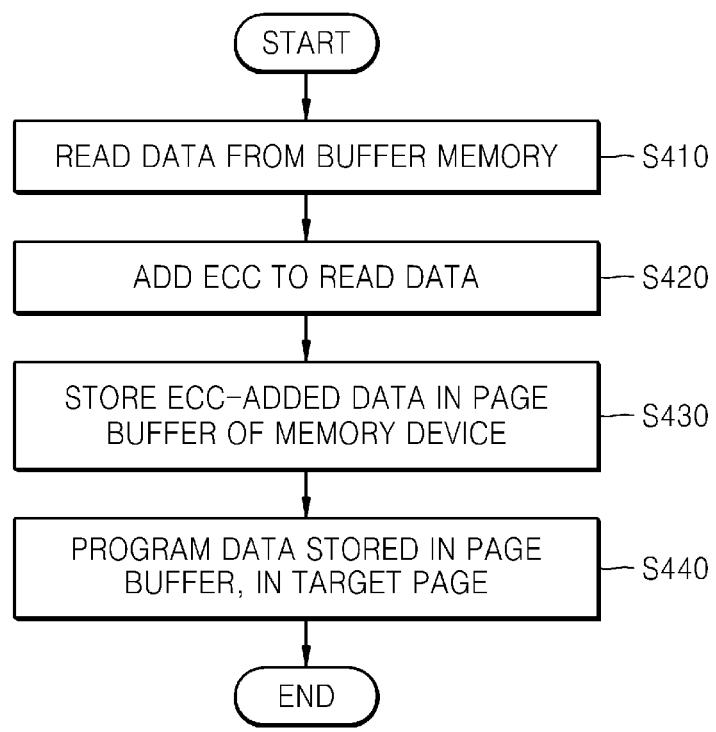
FIG. 13 is a more detailed flowchart summarizing the step of programming data in a target page within the method of FIG. 12 when an external copy-back operation is selected.

FIG. 13 is a somewhat more detailed flowchart further describing the step of programming data in the target page when an external copy-back operation is selected according to the method of FIG. 12.

The memory controller 210 reads data from the buffer memory 220 and outputs the data to the ECC unit 213 (S410), and the ECC unit 213 adds an ECC to the data read from the buffer memory 220 (S420).

The memory controller 210 controls the storage device 200 to transmit the ECC-added data to the memory device 230 and to store the data in a page buffer of the memory device 230 (S430). Then, the memory controller 210 controls the storage device 200 to program the data stored in the page buffer, in a target page of the memory device 230 (S440).

Figure 14:
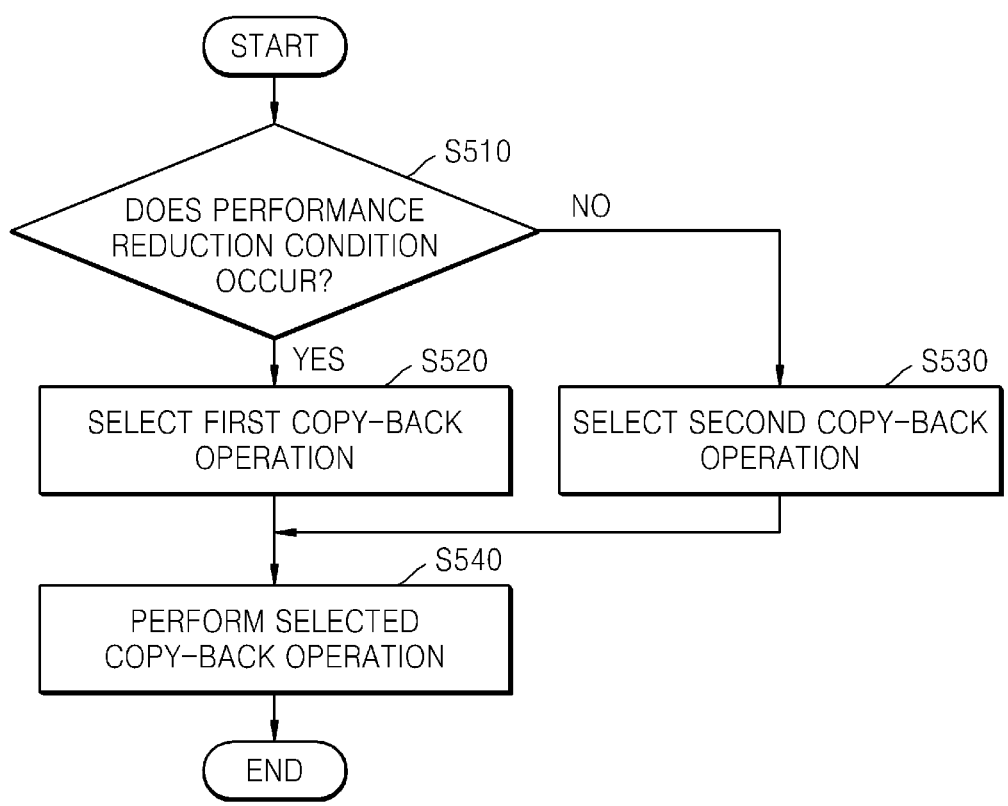
FIG. 14 is a flowchart summarizing an adaptive copy-back method according to another embodiment of the inventive concept.

FIG. 14 is a flowchart of an adaptive copy-back method according to another embodiment of the inventive concept. In certain embodiments, the adaptive copy-back method illustrated in FIG. 14 may be performed by the storage device 200 under the control of the memory controller 210.

The memory controller 210 determines whether a given performance reduction condition occurs due to an access bottleneck for the buffer memory 220 of the storage device 200 (S510). For example, the performance reduction condition may be determined based on the number of operations allocated to channels and ways of the storage device 200. Specifically, the performance reduction condition may be set within a range of the number of operations allocated to channels and ways when a variation in a value of input/output operations per second (IOPS) according to a variation in the number of operations allocated to the channels and ways exceeds a reference value. Here, the value of IOPS represents the number of I/O accesses to the memory device 230 according to I/O commands per second.

Figure 16:
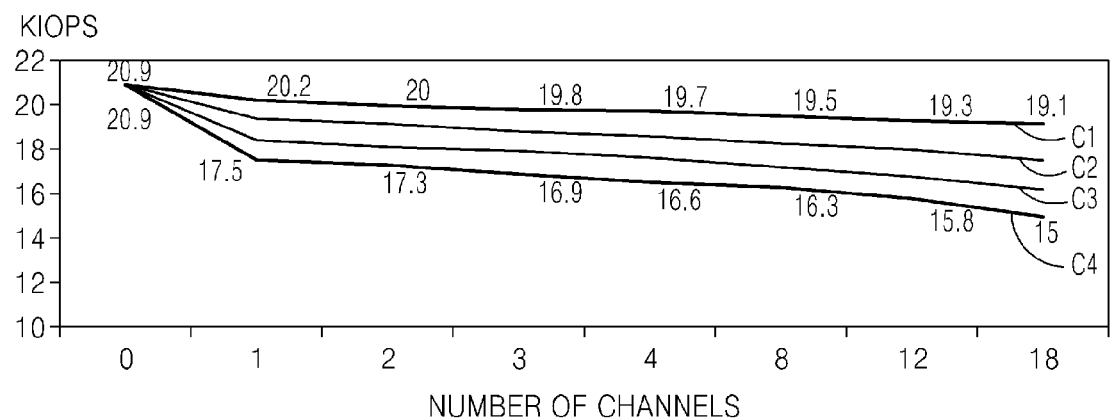
FIG. 16 is a graph illustrating variation in performance according to a number of operations allocated to channels and ways of the storage device of FIG. 1.

FIG. 16 is a graph showing variations in performance according to the number of operations allocated to channels and ways of the storage device 200 illustrated in FIG. 1.

In FIG. 16, the horizontal axis indicates a number of channels for selecting and performing an external copy-back operation when a copy-back operation is simultaneously performed in all channels. As indicated, a case when the number of channels is 0 means that an internal copy-back operation is simultaneously selected in all channels, and a case when the number of channels is 16 means that an external copy-back operation is simultaneously selected in all sixteen channels. The vertical axis represents a value of thousands ("kilo") of input/output operations per second (KIOPS) in the storage device 200. C1 represents a case when a copy-back operation is performed in one way, C2 represents a case when a copy-back operation is simultaneously performed in two ways, C3 a case when a copy-back operation is simultaneously performed in three ways, and C4 a case when a copy-back operation is simultaneously performed in four ways.

Referring to FIG. 16, it may be seen that the performance of the storage device 200 is greatly reduced based on the number of ways simultaneously performing a copy-back operation rather than the number of channels simultaneously selecting and performing an external copy-back operation. In this case, a performance reduction condition may be set within a range of the number of operations allocated to channels and ways when a variation in a value of IOPS exceeds a target reference value based on the number of operations allocated to ways rather than channels.

Referring back to FIG. 14, if it is determined that the performance reduction condition occurs due to a bottleneck phenomenon of accesses to the buffer memory 220, the memory controller 210 selects a first copy-back operation during a garbage collection process (S520).

If it is determined that the performance reduction condition does not occur due to a bottleneck phenomenon of accesses to the buffer memory 220, the memory controller 210 selects a second copy-back operation during the garbage collection process (S530).

Then, the memory controller 210 controls the storage device 200 to perform the selected copy-back operation (S540). If the first copy-back operation is selected, the memory controller 210 controls the storage device 200 to perform a copy-back operation according to the copy-back method illustrated in FIG. 11. Otherwise, if the second copy-back operation is selected, the memory controller 210 controls the storage device 200 to perform a copy-back operation according to a copy-back method illustrated in FIG. 15.

Figure 15:
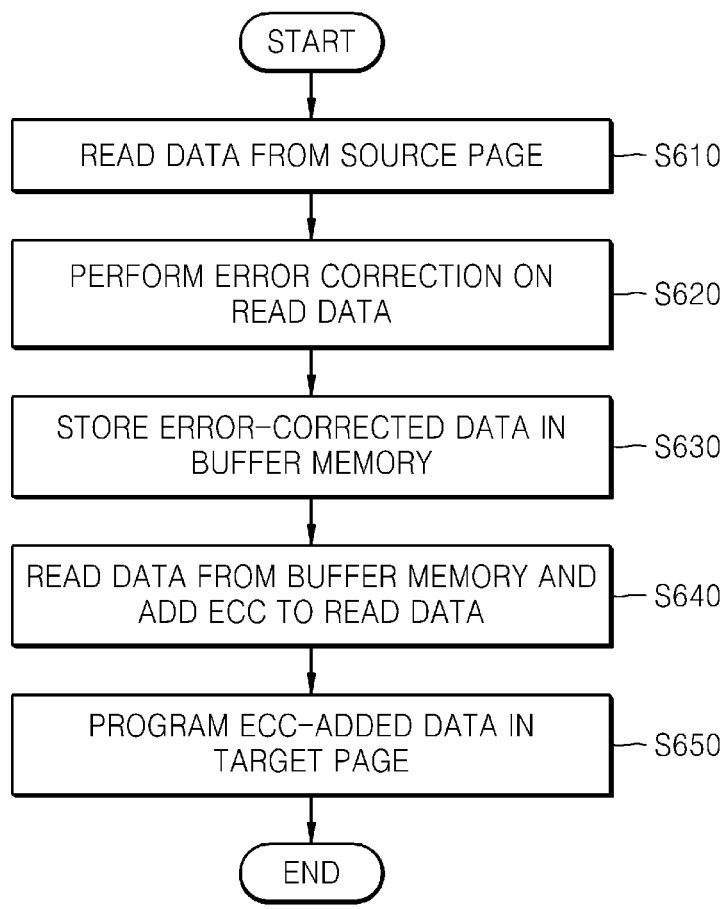
FIG. 15 is a more detailed flowchart summarizing a copy-back method when the second copy-back operation is selected in the method of FIG. 14.

FIG. 15 is a somewhat more detailed flowchart describing a copy-back operation when the second copy-back operation is selected by the method of FIG. 14.

For example, the copy-back approach illustrated in FIG. 15 may be performed in the storage device 200 by the control of the memory controller 210.

The memory controller 210 controls the storage device 200 to read data from a source page of the memory device 230 and to store the page in a page buffer (S610). A source page indicates a valid page included in a data block selected as a victim block. For example, referring to FIG. 8, data read from a source page included in a storage region of the flash memory chip 231-0 is stored in a page buffer of the flash memory chip 231-0.

The memory controller 210 receives the data from the page buffer and performs error correction on the received data by using an ECC engine included in the ECC unit 213 (S620).

The memory controller 210 controls the storage device 200 to store the error-corrected data in the buffer memory 220 (S630).

The memory controller 210 reads the data from the buffer memory 220 and adds an ECC to the read data (S640).

Then, the memory controller 210 controls the storage device 200 to transmit the ECC-added data to the memory device 230 and to program the transmitted data in a target page of the memory device 230 (S650).

Figure 17:
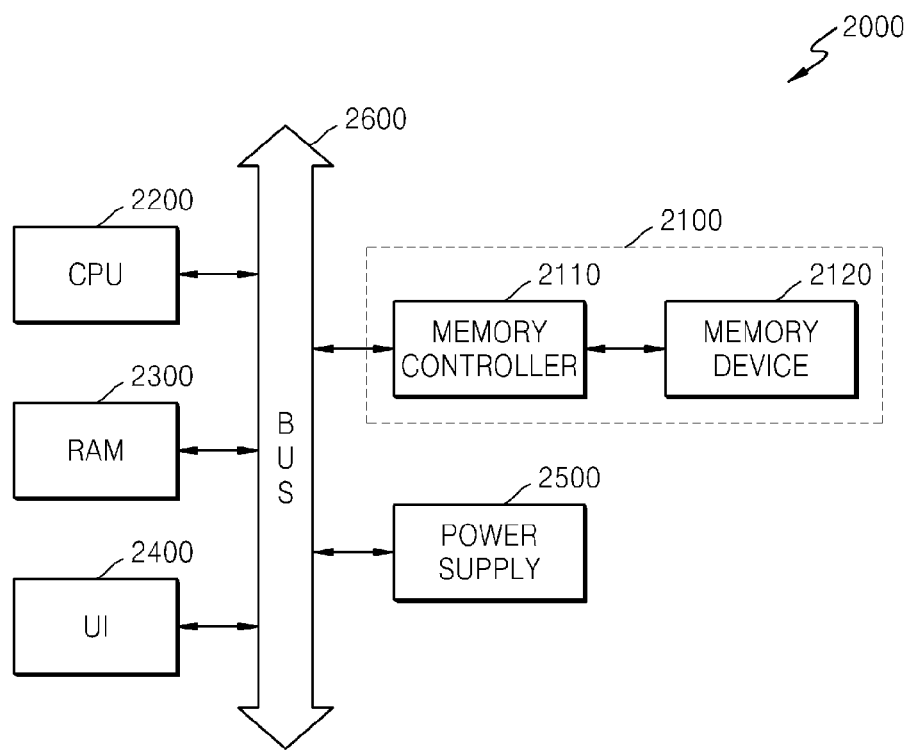
FIG. 17 is a block diagram of a computer system capable of incorporating a storage device according to an embodiment of the inventive concept.

FIG. 17 is a block diagram of a computer system 2000 capable of incorporating a storage device consistent with an embodiment of the inventive concept.

The computer system 2000 includes a central processing unit (CPU) 2200, a RAM 2300, a user interface (UI) 2400, and a storage device 2100 electrically connected via a bus 2600. The storage device 2100 includes a memory controller 2110 and a memory device 2120. The memory device 2120 may store via the memory controller 2110 data processed or to be processed by the CPU 2200. The storage device 2100 may be implemented as the storage device 200 illustrated in FIG. 1. Also, the CPU 2200 may be implemented as the processor 210-1 of the host device 210 illustrated in FIG. 2. The computer system 2000 may further include a power supply 2500.

If the computer system 2000 is a mobile device, the power supply 2500 of the computer system 2000 may be a battery and the computer system 2000 may additionally include a modem such as a baseband chipset. Also, it is well known to one of ordinary skill in the art that the computer system 2000 may further include, for example, an application chipset, a camera image processor (CIS), and a mobile DRAM and thus a detailed description thereof will not be provided here.

Figure 18:
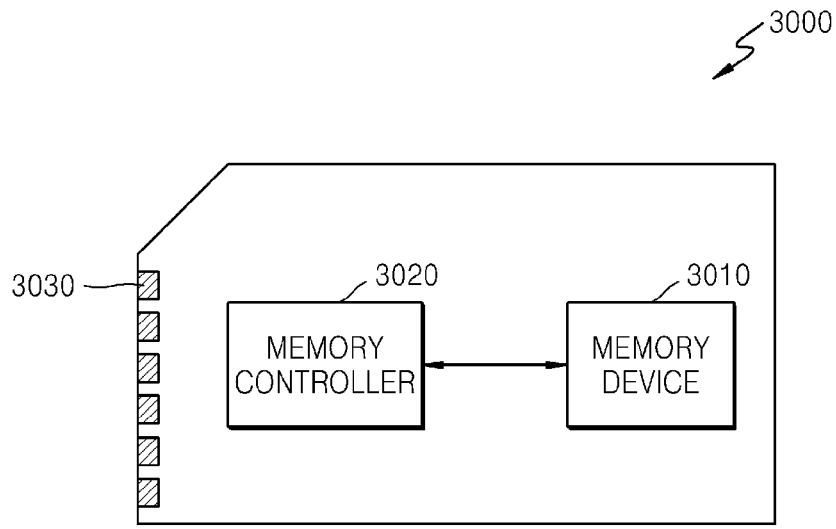
FIG. 18 is a block diagram of a memory card system capable of incorporating a storage device according to an embodiment of the inventive concept.

FIG. 18 is a block diagram of a memory card 3000 capable of incorporating a storage device according to an embodiment of the inventive concept.

Referring to FIG. 18, the memory card 3000 includes a memory controller 3020 and a memory device 3010. The memory controller 3020 controls a write or read operation of data into or from the memory device 3010 in response to a request of an external host received via an I/O means 3030. For this, the memory controller 3020 of the memory card 3000 may include, for example, an interface for interfacing between the host and the memory device 3010, and RAM. The memory card 3000 may be implemented as the storage device 200 illustrated in FIG. 1.

The memory card 3000 may be implemented as a compact flash card (CFC), a micro drive, a smart media card (SMC), a multimedia card (MMC), a security digital card (SDC), a memory stick, or a USB flash memory driver.

Figure 19:
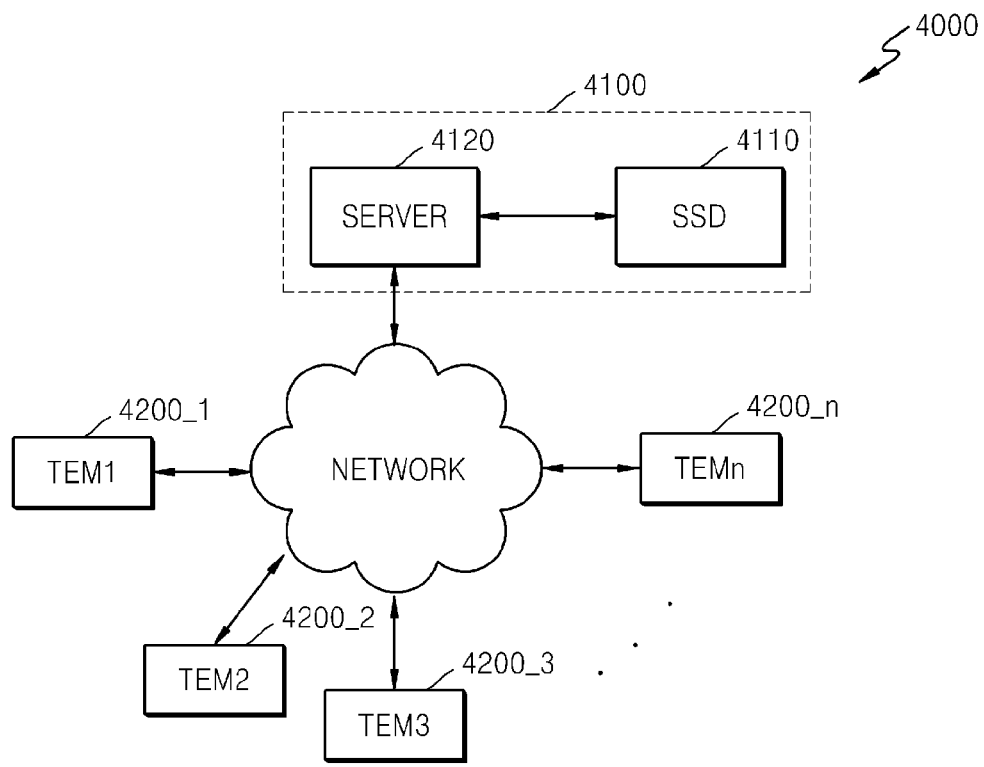
FIG. 19 is a block diagram of a network system capable of incorporating a storage device according to an embodiment of the inventive concept.

FIG. 19 is a block diagram of a network system 4000 and a server system 4100 including an SSD 4110 according to an embodiment of the inventive concept.

Referring to FIG. 19, the network system 4000 may include the server system 4100 and a plurality of terminals 4200_1 through 4200_n connected in a network. The server system 4100 may include a server 4120 for processing requests received from the terminals 4200_1 through 4200_n connected in the network, and the SSD 4110 for storing data corresponding to the requests received from the terminals 4200_1 through 4200_n. In this case, the SSD 4110 may be implemented as the storage device 200 illustrated in FIG. 1.

Meanwhile, the memory system 1000 illustrated in FIG. 1 may be mounted by using various types of packages, e.g., a package on package (POP), a ball grid array (BGA), a chip scale package (CSP), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small-outline integrated circuit (SOIC), a shrink small outline package (SSOP), a thin small outline package (TSOP), a system in package (SIP), a multi chip package (MCP), a wafer-level fabricated package (WFP), and a wafer-level processed stack package (WSP).

While the inventive concept has been particularly shown and described with reference to exemplary embodiments thereof, terms used herein to describe the inventive concept are for descriptive purposes only and are not intended to limit the scope of the inventive concept. Accordingly, it will be understood by one of ordinary skill in the art that various changes in form and details may be made therein without departing from the scope of the following claims.

What is claimed is:

1. An adaptive copy-back method comprising:
determining whether a performance reduction condition has occurred due to a number of operations allocated simultaneously to a buffer memory of a non-volatile memory device, the buffer memory external of the non-volatile memory device;
reading data from a source page of the non-volatile memory device and storing the data in a page buffer within the non-volatile memory device;
performing error correction on the data stored in the page buffer according to a given unit size using an error correction code (ECC) to determine a number of error-corrected bits and to generate error-corrected data;
storing the error-corrected data in the buffer memory;
upon determining that the performance reduction condition has occurred, selectively performing either an external copy-back operation using the error-corrected data stored in the buffer memory, or an internal copy-back operation using the data stored in the page buffer in accordance with the number of error-corrected bits; and
upon determining that the performance reduction condition has not occurred, performing the external copy-back operation using the error-corrected data stored in the buffer memory.

2. The adaptive copy-back method of claim 1, wherein during said selectively performing the external copy-back operation is selected if the number of error-corrected bits exceeds a threshold value, and the internal copy-back operation is selected if the number of error-corrected bits does not exceed the threshold value.

3. The adaptive copy-back method of claim 1, wherein during the internal copy-back operation, the data stored in the page buffer is programmed in a target page of the non-volatile memory device without accessing the error-corrected data stored in the buffer memory.

4. The adaptive copy-back method of claim 1, wherein during the external copy-back operation, the error-corrected data is read from the buffer memory, ECC is calculated and added to the error-corrected data, and the error-corrected data together with the added ECC are programmed in a target page of the non-volatile memory device.

5. The adaptive copy-back method of claim 1, wherein the unit size is defined as a sector size.

6. The adaptive copy-back method of claim 1, wherein the non-volatile memory device includes a flash memory chip.

7. The adaptive copy-back method of claim 6, wherein the non-volatile memory device is a solid state drive (SDD) including a plurality of flash memory chips arranged in relation to a plurality of channels.

8. An adaptive copy-back method comprising:
determining whether a performance reduction condition occurs due to a bottleneck phenomenon related to a number of operations allocated simultaneously to a buffer memory of a storage device;
selecting a first copy-back operation if the performance reduction condition occurs and selecting a second copy-back operation if the performance reduction condition does not occur, wherein upon selecting the first copy-back operation, data stored in a page buffer of a memory device is programmed in a target page of the memory device without accessing data stored in the buffer memory when a number of error-corrected bits per unit size of the data read from a source page to the page buffer is less than a threshold value, and
upon selecting the second copy-back operation, reading error-corrected data stored in the buffer memory and programming the error-corrected data in the target page of the memory device.

9. The adaptive copy-back method of claim 8, wherein the performance reduction condition is determined based on the number of operations allocated to channels and ways of the storage device.

10. The adaptive copy-back method of claim 9, wherein the performance reduction condition is determined within a range of the number of operations allocated to the channels and ways when a variation in a value of (I/O) operations per second (IOPS) according to a variation in the number of operations allocated to the channels and ways exceeds a reference value.

11. The adaptive copy-back method of claim 8, wherein the first copy-back operation comprises:
   reading data from the source page of the memory device and storing the data in the page buffer of the memory device;
   performing error correction on the data stored in the page buffer to determine a number of error-corrected bits per unit size and to generate the error-corrected data;
   storing the error-corrected data in the buffer memory;
   upon determining that the number of error-corrected bits per unit size exceeds a threshold value, reading the error-corrected data from the buffer memory, adding error correction code (ECC), and programming the error-corrected data together with the ECC in the target page of the memory device; and
   upon determining that the number of error-corrected bits per unit size does not exceed the threshold value, programming the data stored in the page buffer in the target page of the memory device without accessing the buffer memory.

12. The adaptive copy-back method of claim 8, wherein the second copy-back operation comprises:
   reading data from the source page of the memory device;
   performing error correction on the read data using ECC to generate the error-corrected data;
   storing the error-corrected data in the buffer memory; and thereafter,
   programming the error-corrected data together with corresponding ECC in the target page of the memory device.

13. The adaptive copy-back method of claim 8, wherein each one of the first copy-back operation and the second copy-back operation is performed during a garbage collection process.

14. A storage device comprising:
   a non-volatile memory device comprising a page buffer that temporarily stores data read from at least one source page;
   a buffer memory external to the non-volatile memory device; and
   a memory controller that determines whether a performance reduction has occurred due to a number of operations simultaneously allocated to the buffer memory, performs error correction on the data provided from the page buffer to generate error-corrected data and determine a number of error-corrected bits per unit size of the data, stores the error-corrected data in the buffer memory, and then when it has been determined that performance reduction has occurred selectively performs, in view of the number of error-corrected bits per unit size of the data, one of an external copy-back operation using the error-corrected data stored in the buffer memory, and an internal copy-back operation using the data stored in the page buffer.

15. The storage device of claim 14, wherein upon determining that the number of error-corrected bits per unit size exceeds a threshold value, the memory controller selects the external copy-back operation that reads the error-corrected data from the buffer memory, calculates and adds ECC to the error-corrected data, and then programs the error-corrected data together with the added ECC in a target page of the memory device.

16. The storage device of claim 15, wherein upon determining that the number of error-corrected bits per unit size does not exceeds the threshold value, the memory controller selects the internal copy-back operation that programs the data stored in the page buffer in the target page of the memory device without accessing data stored in the buffer memory.

17. A method of operating a storage device including a non-volatile memory device having multiple non-volatile memory chips arranged in operation according to multiple channels and a volatile buffer memory, the method comprising:
   during a garbage collection process for the non-volatile memory device, determining whether a performance reduction condition exists by determining a number of the multiple channels simultaneously accessing the buffer memory; and
   upon determining that the performance reduction condition exists, performing at least one copy-back operation,
   wherein the at least one copy-back operation is an external copy-back operation that transfers data stored in the buffer memory to the non-volatile memory device when a number of error-corrected bits per unit size for data stored in a page buffer of the non-volatile memory device exceeds a threshold value, and
   the at least one copy-back operation is an internal copy-back operation that does not transfer data stored in the buffer memory to the non-volatile memory device when the number of error-corrected bits per unit size for the data stored in the page buffer does not exceed the threshold value.

18. The method of claim 17, further comprising:
   reading data from a source page of the non-volatile memory device and storing the data in the page buffer;
   performing error correction on the data stored in the page buffer according to a given unit size using an error correction code (ECC) to determine the number of error-corrected bits and generate the error-corrected data; and
   storing the error-corrected data in the buffer memory.

19. The method of claim 18, wherein during the internal copy-back operation, the data stored in the page buffer is programmed in a target page of the non-volatile memory device without accessing the error-corrected data stored in the buffer memory.

20. The method of claim 19, wherein during the external copy-back operation, the error-corrected data is read from the buffer memory, an ECC is calculated and added to the error-corrected data, and the error-corrected data together with the added ECC are programmed in the target page of the non-volatile memory device.

* * * * *